T. O. CUTLER.
Quartz Mills.
No. 143,336. Patented September 30, 1873.
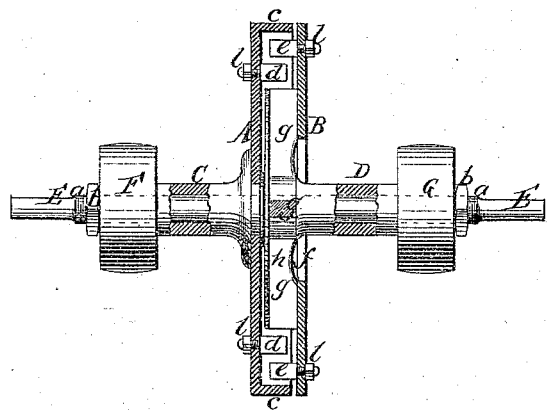
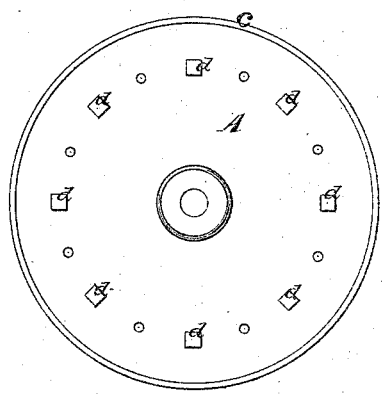 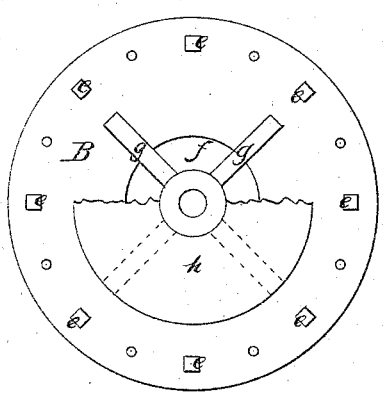
Witnesses.
E. G. Kastenhuber
Ernst Billuber
Inventor.
Thomas O. Cutler

UNITED STATES PATENT OFFICE.

THOMAS O. CUTLER, OF JERSEY CITY, NEW JERSEY.

IMPROVEMENT IN QUARTZ-MILLS.

Specification forming part of Letters Patent No. 143,336, dated September 30, 1873; application filed March 6, 1873.

*To all whom it may concern:*

Be it known that I, THOMAS O. CUTLER, of Jersey City, in the county of Hudson and State of New Jersey, have invented a new and Improved Mill for Reducing Quartz and other Material; and I do hereby declare the following to be a full, clear, and exact description thereof, which will enable those skilled in the art to make and use the same, reference being had to the accompanying drawing, forming part of this specification, in which drawing—

Figure 1 represents a vertical central section of my invention. Fig. 2 is a face view of one of the grinding-disks. Fig. 3 is a similar view of the other grinding-disk.

Similar letters indicate corresponding parts.

This invention consists in the arrangement of two disks which revolve in opposite directions, one of said disks being provided with a flange or rim that projects close to the face of the other disk, while the same or the other disk is furnished with a central feed-opening, and both disks are provided with reversible beaters, those on one disk working between those on the other disk, in such a manner that the material fed between the two disks through the central opening is, by the centrifugal force, thrown violently against and among the beaters, and, by the action of the beaters, said material is rapidly reduced.

In the drawing, the letters A B designate two disks, which are mounted on the ends of hollow shafts C D, supported by a solid stationary shaft, E, which is provided with screw-threads $a\ a$ and nuts $b\ b$, by means of which the distance between the faces of the two disks can be adjusted. On each of the hollow shafts C D is mounted a pulley, F or G, and by means of these pulleys the disks are rotated in opposite directions. The same object may, however, be obtained by mounting the two disks A B on two independent solid shafts, which can be adjusted toward or from each other in their bearings; or one of the disks might be mounted on a solid shaft which forms the bearing for the tubular shaft of the other disk. The disk A is provided with a rim or flange, $c$, the edge of which is so adjusted that it runs close to the face of the other disk, B, leaving a circular aperture for the discharge of the ground material. By increasing or decreasing this aperture, the fineness of the product is determined. In the faces of the disks A B are secured beaters $d\ e$, in such a position that the beaters $e$ of the disk B work between the beaters on the disk A; and the beaters are made square, of hardened steel or other material, and they are secured in the disks by nuts $l$, so that they can be turned round, and that either of their faces can be brought in working position.

By this arrangement the beaters can be used until all their faces are worn out.

The material to be reduced is fed between the disks through an aperture, $f$, at the center of the disk B; and this aperture is provided with radiating flanges or arms $g$, which are secured to the inner face of the disk B, and protected by a head, $h$, so that, by the action of said arm, the material, on being fed between the two disks, is thrown with great force against the beaters, whereby the large pieces are broken up, and the particles thus produced held in the mill by the rim or flange until, by the action of the air, causing the attrition of the particles, the material is reduced. The material, after having attained the required fineness, discharges through the circular aperture between the edge of the flange $c$ and the face of the disk B; but said flange prevents the discharge of all such parts which have not yet been reduced to the required degree.

If desired, discharge-openings may also be made through either of the disks.

By means of this mill, quartz or other material can be rapidly reduced to any degree of fineness.

My mill can also be run on a vertical shaft.

I do not, broadly, claim two disks revolving in opposite directions, whereby is formed the cage of an ore-crusher, for such is not my invention; but

What I claim as new, and desire to secure by Letters Patent, is—

The disk A, provided with the lateral flange $c$ and beaters $d$, in combination with the disk A, beaters $e$, and arms $g\ g$, arranged and operated substantially as described, the disks A B being adjusted in respect to each other so as to leave a discharge-space between the flange $c$ and the disk A, as and for the purpose specified.

T. O. CUTLER.

Witnesses:
W. HAUFF,
E. G. KASTENHUBER.